United States Patent
Lewis et al.

(10) Patent No.: US 8,972,404 B1
(45) Date of Patent: Mar. 3, 2015

(54) METHODS AND SYSTEMS FOR ORGANIZING CONTENT

(75) Inventors: Glenn M. Lewis, Costa Mesa, CA (US); Kirill Buryak, Sunnyvale, CA (US); Aner Ben-Artzi, Los Angeles, CA (US); Jun Peng, San Ramon, CA (US); Nadav Benbarak, Boston, MA (US)

(73) Assignee: Google Inc., Mountain View, CA (US)

( * ) Notice: Subject to any disclaimer, the term of this patent is extended or adjusted under 35 U.S.C. 154(b) by 259 days.

(21) Appl. No.: 13/531,081

(22) Filed: Jun. 22, 2012

Related U.S. Application Data

(60) Provisional application No. 61/580,503, filed on Dec. 27, 2011, provisional application No. 61/594,677, filed on Feb. 3, 2012.

(51) Int. Cl.
*G06F 17/30* (2006.01)

(52) U.S. Cl.
CPC ...... *G06F 17/30705* (2013.01); *G06F 17/3071* (2013.01)
USPC ............ 707/737; 707/738; 707/748; 707/758

(58) Field of Classification Search
CPC ........................ G06F 17/30705; G06F 17/3071
USPC ......... 707/738, 705, 706, 709, 722, 723, 728, 707/731, 737, 740, 748
See application file for complete search history.

(56) References Cited

U.S. PATENT DOCUMENTS

| | | | |
|---|---|---|---|
| 6,751,614 B1 | 6/2004 | Rao | |
| 7,107,550 B2 | 9/2006 | Newman | |
| 7,158,986 B1 | 1/2007 | Oliver et al. | |
| 7,333,998 B2 * | 2/2008 | Heckerman et al. ... | 707/999.006 |
| 7,496,567 B1 | 2/2009 | Steichen | |
| 7,584,100 B2 | 9/2009 | Zhang et al. | |
| 7,590,657 B1 | 9/2009 | Cormode et al. | |
| 7,593,904 B1 | 9/2009 | Kirshenbaum et al. | |
| 7,636,730 B2 * | 12/2009 | Sanfilippo et al. ..... | 707/999.101 |
| 7,716,163 B2 * | 5/2010 | Reynar et al. ................. | 707/739 |
| 7,797,265 B2 | 9/2010 | Brinker et al. | |
| 7,937,345 B2 | 5/2011 | Schmidtler et al. | |
| 7,958,067 B2 | 6/2011 | Schmidtler et al. | |
| 8,090,717 B1 | 1/2012 | Bharat et al. | |
| 8,117,216 B1 * | 2/2012 | Chanda et al. ................. | 707/754 |
| 8,131,722 B2 * | 3/2012 | Sundaresan et al. .......... | 707/737 |
| 8,161,048 B2 | 4/2012 | Procopiuc et al. | |
| 8,189,494 B2 | 5/2012 | Budampati et al. | |
| 8,538,966 B2 * | 9/2013 | Reese et al. .................... | 707/737 |
| 8,676,815 B2 * | 3/2014 | Deng et al. .................... | 707/749 |

(Continued)

*Primary Examiner* — Jay Morrison
*Assistant Examiner* — Dangelino Gortayo
(74) *Attorney, Agent, or Firm* — Armstrong Teasdale LLP

(57) ABSTRACT

A computer-implemented method executes instructions stored on a computer-readable medium. The method includes accessing a hierarchy of clusters, wherein each cluster includes at least one content file, and a label is associated with each cluster. The method further includes calculating a topic purity score for each cluster, and selecting a first cluster and a second cluster from the hierarchy of clusters, wherein the topic purity score of the first cluster and the second cluster are less than a purity threshold. The method also includes creating a third cluster by combining the content files included within the first cluster and the second cluster, determining a parent category of the first cluster and the second cluster, wherein the parent category is at a level within the hierarchy higher than a level of the first cluster and the second cluster, and associating a label of the parent category with the third cluster.

19 Claims, 6 Drawing Sheets

(56) References Cited

U.S. PATENT DOCUMENTS

| | | |
|---|---|---|
| 2003/0130993 A1 | 7/2003 | Mendelevitch et al. |
| 2005/0076005 A1* | 4/2005 | Chefalas et al. .......... 707/2 |
| 2006/0095521 A1 | 5/2006 | Patinkin |
| 2006/0155575 A1 | 7/2006 | Gross |
| 2007/0027830 A1 | 2/2007 | Simons et al. |
| 2008/0120292 A1 | 5/2008 | Sundaresan et al. |
| 2008/0205775 A1 | 8/2008 | Brinker et al. |
| 2009/0070325 A1 | 3/2009 | Gabriel et al. |
| 2010/0017487 A1 | 1/2010 | Patinkin |
| 2010/0122212 A1 | 5/2010 | Boudalier |
| 2010/0223276 A1 | 9/2010 | Al-Shameri et al. |
| 2011/0145178 A1 | 6/2011 | Schmidtler et al. |
| 2012/0016877 A1 | 1/2012 | Vadrevu et al. |
| 2012/0078969 A1 | 3/2012 | Ananthanarayanan et al. |
| 2013/0117267 A1 | 5/2013 | Buryak et al. |

* cited by examiner

METHODS AND SYSTEMS FOR ORGANIZING CONTENT

CROSS REFERENCE TO RELATED APPLICATIONS

This application claims priority to provisional patent application Ser. No. 61/580,503 filed on Dec. 27, 2011, and provisional patent application Ser. No. 61/594,677 filed on Feb. 3, 2012, which are both hereby incorporated by reference in their entirety.

BACKGROUND OF THE INVENTION

This invention relates generally to organizing content, and, more particularly, to methods and systems for organizing content by validating clustered documents based on a topic purity of a common taxonomy parent category.

Organizations and businesses can receive a large number of messages from customers, potential customers, users and/or other people. For example, a business and/or organization can receive messages from its customers and potential customers, such as email messages, messages from online forums, e.g., support forums or message boards, and other types of messages. These messages can be related to a variety of different topics or issues. For example, the messages can be related to problems experienced by a user and can include a request for assistance to solve the problem. Oftentimes, these request messages are directed to a support center at the organization/business.

In addition, the Internet provides these organizations and businesses with access to a wide variety of resources, including web pages for particular topics, reviews of products and/or services, news articles, editorials and blogs. The authors of these resources can express their opinions and/or views related to a myriad of topics such a product and/or service, politics, political candidates, fashion, design, etc. For example, an author can create a blog entry supporting a political candidate and express their praise in the candidate's position regarding fiscal matters or social issues. As another example, authors can create a restaurant review on a blog or on an online review website and provide their opinions of the restaurant using a numerical rating (e.g., three out of five stars), a letter grade (e.g., A+) and/or a description of their dining experience to indicate their satisfaction with the restaurant.

Such a large volume of documents (i.e., different types of electronic documents including text files, e-mails, images, metadata files, audio files, presentations, etc.) can be very difficult for organizations and/or businesses to manage. Entities may try to use clustering techniques to manage such a large volume of documents. Various algorithms can be used on a corpus of documents to produce different clusters of documents such that the documents within a given cluster share a common characteristic. These known clustering algorithms can be very time consuming to implement, and oftentimes provide poor results such as clusters having many unrelated documents.

In addition, businesses have been known to label a cluster based on a common characteristic shared by the documents in the cluster. A label can identify various types of information such as a subject or theme of a given cluster and therefore facilitate classification. In many of these known cases, document clusters are labeled by manual inspection where an operator retrieves samples from different clusters and labels the clusters based on information from the samples. Labeling of clusters using manual inspection is very time consuming and expensive.

Accordingly, it would be desirable to provide a computer system for organizing large volumes of electronic documents within clusters wherein the documents within each cluster relate to a particular topic, and for automatically determining a label for each created cluster.

BRIEF DESCRIPTION OF THE INVENTION

In one embodiment, a computer-implemented method that includes executing instructions stored on a computer-readable medium is provided. The method includes accessing a hierarchy of clusters, wherein each cluster includes at least one content file, and a label is associated with each cluster. The method further includes calculating a topic purity score for each cluster, and selecting a first cluster and a second cluster from the hierarchy of clusters, wherein the topic purity score of the first cluster and the second cluster are less than a purity threshold. The method also includes creating a third cluster by combining the content files included within the first cluster and the second cluster, determining a parent category of the first cluster and the second cluster, wherein the parent category is at a level within the hierarchy higher than a level of the first cluster and the second cluster, and associating a label of the parent category with the third cluster.

In another embodiment, a computer system having a computer-readable storage medium for storing computer-executable instructions and a processor coupled to the computer-readable storage medium is provided. The processor is configured to execute the computer-executable instructions to calculate a topic purity score for each cluster within a hierarchy of clusters wherein each cluster includes at least one content file and wherein a label is associated with each cluster, and to select a first cluster and a second cluster from the hierarchy of clusters wherein the topic purity score of the first cluster and the topic purity score of the second cluster are less than a purity threshold. The processor also creates a third cluster by combining the content files included within the first cluster and the second cluster, determines a parent category of the first cluster and the second cluster wherein the parent category is at a level within the hierarchy higher than a level of the first cluster and the second cluster, and associates a label of the parent category with the third cluster.

In another embodiment, a computer-readable medium including computer-executable instructions stored thereon that, when executed, cause a processor to access a hierarchy of clusters is provided. Each cluster includes at least one content file, and a label is associated with each cluster. The instructions cause the processor to calculate a topic purity score for each cluster, select a first cluster and a second cluster from the hierarchy of clusters wherein the topic purity score of the first cluster and the topic purity score of the second cluster are less than a purity threshold, and create a third cluster by combining the content files included within the first cluster and the second cluster. The instructions further cause the processor to determine a parent category of the first cluster and the second cluster wherein the parent category is at a level within the hierarchy higher than a level of the first cluster and the second cluster, and associate a label of the parent category with the third cluster.

BRIEF DESCRIPTION OF THE DRAWINGS

FIG. 1 is a block diagram of a system for providing hierarchical clustering of a group of content files.

FIG. 2 is a flowchart illustrating an exemplary method of hierarchical clustering that may be used with the system shown in FIG. 1.

FIG. 3 is a block diagram illustrating an example of hierarchal clustering using the system shown in FIG. 1.

FIG. 4 is a block diagram of an exemplary taxonomy of categories that may be obtained from the hierarchy of clusters shown in FIG. 3.

FIG. 5 is a flow diagram of an exemplary method for categorizing content files that may be used with the system shown in FIG. 1.

FIG. 6 is a schematic block diagram of an exemplary computer system that may be used to implement the embodiments described in FIGS. 1-5.

DETAILED DESCRIPTION OF THE INVENTION

Figure 1:
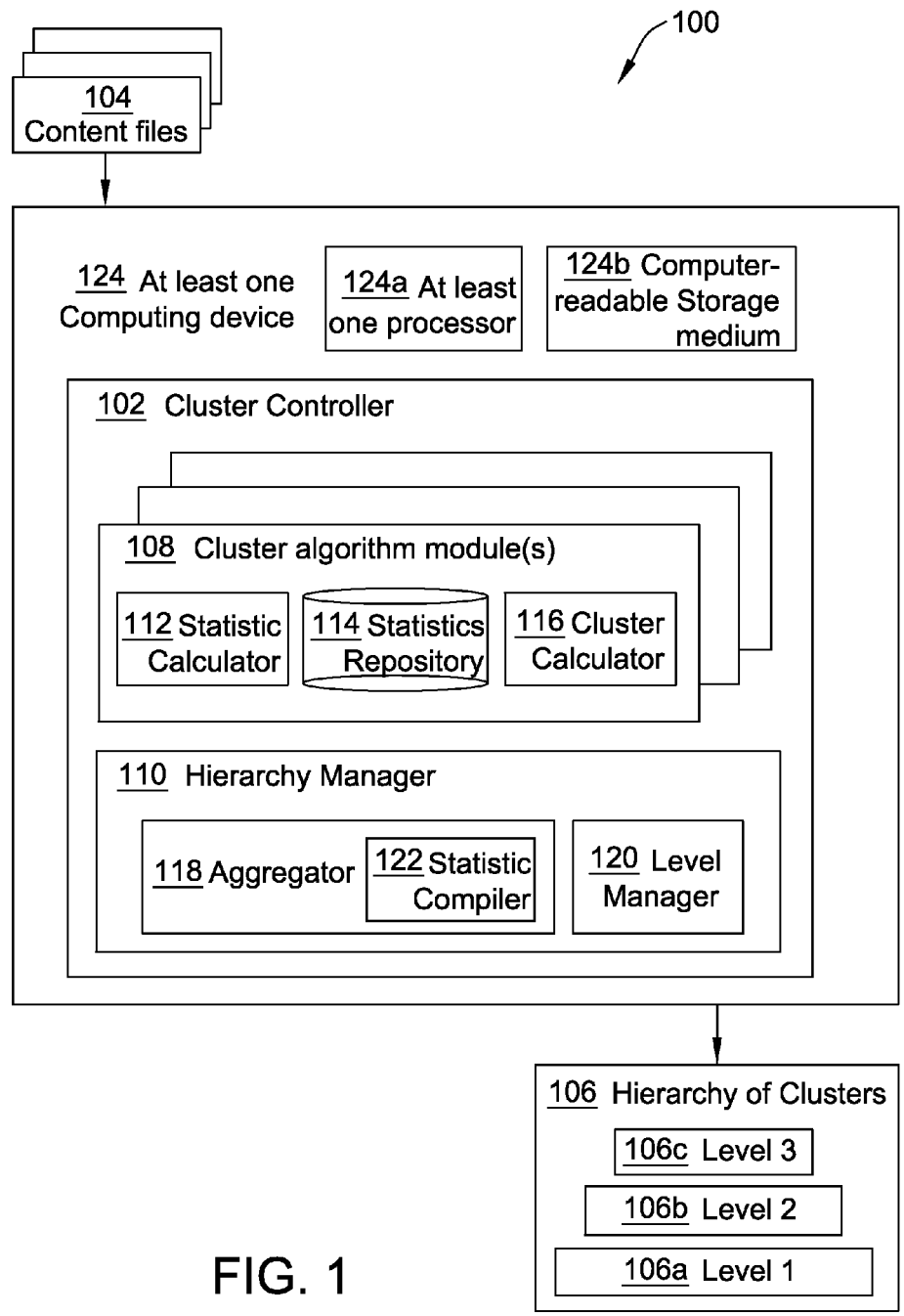
FIGS. 1-6 show exemplary embodiments of the methods and systems described herein.

Embodiments of the methods and systems described herein enable a computer system to access a hierarchy of clustered content files and a taxonomy of categories obtained from the hierarchy. The taxonomy includes a plurality of levels, and each level may include one or more categories having a label associated therewith. A topic purity score is calculated for each cluster to determine a level of confidence that the cluster has been appropriately categorized within the taxonomy. The topic purity score for each cluster is compared to a purity threshold. If the topic purity score for a cluster equals, or is greater than the purity threshold, a label associated with the cluster is approved.

However, if the topic purity score for a cluster (e.g., a first cluster) is less than the purity threshold, another (e.g., a second) cluster is identified that also has a topic purity score that is less than the threshold. The first cluster and the second cluster are combined into a third cluster, and a parent category of the third cluster is determined. If an action is associated with the parent category, the label of the parent category is associated with the third cluster such that the label of the first cluster and the label of the second cluster are replaced with the label of the parent category. However, if no action is associated with the parent category, the labels of the first cluster and the second cluster are retained. As described below in more detail, an action may include transmitting a document to a user, transmitting an message to the user, initiating a communication with the user, transmitting a message to a supervisor, or any other action.

The following detailed description illustrates embodiments of the invention by way of example and not by way of limitation. It is contemplated that the invention has general application to processing electronic documents such as email messages, messages from online forums (e.g., support forums or message boards), other types of messages, web pages, reviews of products and/or services, news articles, editorials, blogs, text files, images, metadata files, audio files, presentations, and other electronic documents by a party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: a) accessing a hierarchy of clusters, wherein each cluster includes at least one content file, and wherein a label is associated with each cluster; b) calculating a topic purity score for each cluster in a hierarchy of clusters; c) selecting a first cluster and a second cluster from a hierarchy of clusters, wherein a topic purity score of the first cluster and a topic purity score of the second cluster are less than a purity threshold; d) creating a third cluster by combining content files included within a first cluster and a second cluster; e) determining a parent category of a first cluster and a second cluster, wherein the parent category is at a level within a cluster hierarchy that is higher than a level of the first cluster and the second cluster; and f) associating a label of a parent category with a third cluster.

FIG. 1 is a block diagram of a system 100 for providing hierarchical clustering of a group of content files. In the example of FIG. 1, a cluster controller 102 is configured to receive a plurality of content or data files 104, and to output a hierarchy of clusters 106. The hierarchy of clusters 106 includes a plurality of hierarchical levels, illustrated conceptually in the example of FIG. 1 as level 1 (106A), level 2 (106B) and level 3 (106C).

The hierarchy 106 thus includes a plurality of hierarchical levels of clusters, in which, in the example, a number of clusters at each level decreases as the number of the level increases. That is, each level beyond, or higher than, the level 106A (i.e., levels 106B . . . 106n) generally includes a clustering of clusters included within the immediately lower/preceding level, so that a number of clusters at each level decreases as the number of the corresponding level increases. Thus, the hierarchy 106 may serve to organize the content files 104 in a manner which facilitates a productive and efficient use thereof by the user of the system 100, as described in more detail below.

Specifically, as shown in the example of FIG. 1, the cluster controller 102 may include one or more cluster algorithms modules 108 which, as referenced above, may be configured to receive the content files 104 and to output resulting clusters of the content files 104. In other words, for purposes of this description, the cluster algorithm modules 108 may generally represent one or more conventional clustering algorithms.

The cluster controller 102 may further include a hierarchy manager 110 which may be configured to parameterize and otherwise operate the one or more cluster algorithm modules 108 in order to provide the hierarchy of clusters 106. More specifically, as described in detail herein, the hierarchy manager 110 may be configured, e.g., to define a number of levels within the hierarchy of clusters 106, as well as to define a number of clusters at each level (and/or a number of content files within each cluster). As further described herein, the hierarchy manager 110 may be configured to iteratively construct the hierarchy 106 by receiving an output of the one or more cluster algorithm modules, and thereafter transforming the received output into an input format which is compatible with subsequent input to the one or more cluster algorithm modules 108, to thereby obtain a subsequent level of the hierarchy of clusters 106. In other words, the hierarchy manager 110 may be configured to execute an iterative loop in which clusters that are output by the one or more cluster algorithm modules 108 are individually compiled or otherwise aggregated (i.e., on a cluster by cluster basis) and thereafter provided again to the cluster algorithm modules 108 for further clustering thereof. Thus, each output of the cluster algorithm module(s) 108 may be understood to represent a level of the hierarchy 106, and subsequent cluster-specific aggregation at each such level may be understood to represent a subsequent input to the one or more cluster algorithm modules 108 (to thereby obtain a following level of the hierarchy of clusters 106, and so on).

In this way, one or more cluster algorithm modules 108 may be utilized to obtain a hierarchy of clusters 106 that is useful in facilitating a desired access to, or other use of, information contained within the content files 104. Moreover, as described, the cluster controller 102 provides for parameterization of the hierarchy 106. For example, an operator of the system 100 may easily designate a number of levels 106A-106C . . . 106n of the hierarchy 106, simply by designating a corresponding number of times that the hierarchy manager 110 is configured to iteratively provide an output of the one or more cluster algorithm modules 108 to an input thereof. Further, an operator of the system 100 may designate a number of clusters at each level of the hierarchy 106.

Thus, in one example, the content files 104 may initially include 100,000 individual content files (e.g., text based documents). In this case, the first level 106A of the hierarchy 106 may be constructed by the cluster controller 102 so as to include 1000 clusters, each such cluster containing however many of the 100,000 content files are included therein (according to an underlying parameterization of the cluster algorithm module 108 used to construct the first level 106A).

Meanwhile, the second level 106B of the hierarchy 106 may include 100 clusters, where, as referenced above, each of the 100 clusters includes a number of clusters of the underlying 1000 clusters of the first level 106A that is dictated by parameterization of the cluster algorithm module 108. Similarly, in the example, the third and final level 106C may include 10 clusters, each of which may contain a number of clusters of the underlying 100 clusters included in the second level 106B.

As described in detail herein, an output of the one or more cluster algorithm modules 108 thus serves as both a level of the hierarchy 106, and as a subsequent input to the one or more cluster algorithm modules 108 for obtaining a subsequent/higher level of the hierarchy 106. In this way, the cluster controller 102 may operate to provide the hierarchy of clusters 106 using clustering algorithms, without requiring significant additional expertise on the part of the operator of the system 100 (beyond that which is necessary for operation of the clustering algorithms themselves). Other features and advantages of the system 100 of FIG. 1 are described in more detail, below.

In the example of FIG. 1, the one or more clustering algorithm modules 108 are illustrated as including a number of illustrative subcomponents representing conventional functionalities of the clustering algorithm module(s) 108 in performing clustering of the content files 104. In particular, as shown, the clustering algorithm module 108 may include a statistic calculator 112 which may be configured to receive the content files 104 and to determine a number of statistical measures or other characterizations of the content thereof.

For example, the statistic calculator 112 may compute a number of times that a particular word or phrase appears within each of the content files 104. In another example, the statistic calculator 112 may compute a number or frequency of words and phrases which are determined to have a similar semantic meaning. In still other examples, the statistic calculator 112 may compute measures of various types of metadata related to each content file, rather than, or in addition to, computing statistical characterizations of the content itself. For example, the statistic calculator 112 may compute a number of times that the content files are retrieved from a database, or may calculate information characterizing a source of each content file, e.g., a physical location of storage from which the content files are retrieved, or referring to an identity of an author of each content file. Other examples of calculated statistics are known, or would be apparent.

In many of the examples that follow, the content files 104 are discussed as including text-based documents. In such examples, the statistic calculator 112 may be configured to calculate various statistical measures regarding the text within such documents, as described in detail herein. Of course, as otherwise described herein, the content files 104 are not limited to text-based documents, and may include image files, video files, audio files, or virtually any other type of digital media used to store information, or combinations thereof.

During operation, the statistic calculator 112 may be configured to store calculated statistics within a statistics repository 114. For example, in the examples just referenced in which the content files 104 include text-based documents, the statistic calculator 112 may receive each document, and may calculate a number or frequency of specified words, phrases, or other content for the received document. Then, the calculated statistical information for the document in question may be stored in relation to the document within the statistics repository 114. Subsequently, the process of calculating and storing such statistics may be repeated for each of the documents within a specified group of content files, until statistical information for each document is available within the statistics repository 114.

Once the statistics repository 114 is sufficiently completed, a cluster calculator 116 may be configured to utilize the storage statistics to group clusters of the content files 104. Specifically, as referenced above, an operator of the system 100 may parameterize the cluster algorithm module 108 by providing or selecting desired features which characterize the clustering operations of the cluster algorithm module 108. Such feature selection was described above with respect to operation of the statistic calculator 112, and the same, similar, additional, or alternative features may serve as basis for the clustering operations of the cluster calculator 116.

For example, in the example scenarios referenced above in which the content files 104 include text based documents, statistics within the statistics repository 114, as described above, may characterize a number and/or frequency of specified words, phrases, or concepts. Then, the cluster calculator 116 may utilize the statistics in clustering the underlying content files 104 (e.g., text documents). For example, the cluster calculator 116 may include all content files containing a specified word a certain number of times or at a certain frequency within a first cluster, and may include other ones of the content files which contain a different word at the specified number of frequency within a second cluster. Additionally, or alternatively, the cluster calculator 116 may group clusters of the content files 104 based on, e.g., an author of the content file, a number of times each content file has been previously accessed, or on virtually any other characterization of the content file or characteristic of the content files 104.

Thus, the cluster algorithm module 108 may initially input the content files 104, and may output a plurality of clusters of the content files 104. The plurality of clusters obtained, as described above, may thus form a level of the hierarchy 106. At the same time, the hierarchy manager 110 may be configured to render each cluster (and/or information associated with each cluster) suitably for subsequent provision thereof to the cluster algorithm module 108. In this way, the cluster algorithm module 108 may provide an additional or further clustering of the previously obtained clusters for the previous level of the hierarchy 106, so as to thereby provide a further plurality of clusters which form a next-higher level of the hierarchy of clusters 106. As described, this iterative process of feeding an output of the cluster algorithm module 108 to an input thereof may continue until a desired number of levels of the hierarchy of clusters 106 have been obtained.

Thus, as shown, the hierarchy manager 110 may include an aggregator 118 which is configured to compile, integrate, concatenate, or otherwise aggregate content (and/or information characterizing the content) of each cluster of the plurality of clusters included within a given output of clusters of the cluster algorithm module 108. In this way, the aggregator 118 may be configured to translate, reformulate, or otherwise render information within or about each cluster in a format which is compatible for further processing (i.e., clustering) by the cluster algorithm module 108.

As shown, the hierarchy manager 110 may further include a level manager 120 which is configured to utilize operations of the aggregator 118 in conjunction with the cluster algorithm module 108 to construct the hierarchy 106. In this regard, and as explained in more detail herein, the level manager 120 may be configured, e.g., to designate a number of levels of the hierarchy 106 (e.g., a number of levels desired by an operator of the system 100), and to characterize or parameterize each such level in a desired manner.

Further, the level manager 120 may be configured to manage operations of the aggregator 118 to achieve the desired hierarchy 106. For example, the level manager 120 may be configured to instruct the aggregator 118 as to a number of times necessary to aggregate output of the cluster algorithm module 108 for providing resulting aggregated information back to the inputs of the clustering algorithm module 108. Other examples and details regarding operations of the level manager 120 are provided below.

Specifically, and continuing the example above in which the content files 104 include text documents, and as described above, the cluster algorithm module 108 may be configured to receive the documents and to output clusters thereof. Then, as instructed by the level manager 120, the aggregator 118 may be configured to receive each cluster of the plurality of the clusters output by the cluster algorithm module 108, and to aggregate the content (or information characterizing the content) of each cluster, so as to thereby render such information in a manner suitable for providing to the input of the cluster algorithm module 108.

As in the example above, it may be appreciated that during such operations, 100,000 documents within the content files 104 may initially be clustered by the cluster algorithm module 108 into 1000 clusters. For example, each of the 1000 clusters may contain 100 of the 100,000 documents. Then, the aggregator 118 may be configured to input each cluster of the 1000 clusters, and to aggregate each of the included 100 documents into a "super-document" for each cluster. For example, in the scenario in which the content files 104 included text documents, such aggregation may include concatenation of all the text of the 100 documents of each cluster of the 1000 clusters to form a super-document for each of the 1000 clusters. By virtue of such concatenation, the aggregator 118 may effectively provide a text document (e.g., super-document) which, for all intents and purposes of the cluster algorithm module 108, may serve as an otherwise conventional input thereto.

Thus, in the example, the cluster algorithm module 108 may proceed with clustering, effectively, 1000 super-documents. Consequently, it may be appreciated that the cluster algorithm module 108 may operate substantially in the same manner as during the initial/previous iteration in which the content files 104 were previously clustered. As a result, the cluster algorithm module 108 may output a subsequent plurality of clusters to thereby form a subsequent, corresponding level of the hierarchy 106. In the example, the 1000 super-documents (i.e., the 1000 concatenations of each underlying cluster of 100 documents) may be further clustered into 100 clusters, each containing 10 underlying clusters, each of which itself contains a super-document containing an aggregation of 100 documents. Thus, in the example, the 100 clusters may be observed to contain, directly or indirectly, 1000 content files 104 of the initial set of 100,000 content files 104.

This process may then be repeated for yet a further clustering by the cluster algorithm module 108. In the example, the cluster algorithm module 108 may receive concatenated versions of documents within each of the 100 clusters, and may cluster the concatenated documents, e.g., to thereby obtain a third level of the hierarchy 106 containing 10 clusters. In this way, the hierarchy 106 may be formed as including a decreasing number of clusters at each level 106A-106C of the hierarchy 106. As described, by performing such hierarchical clustering, an operator of the system 100 may be provided with an ability to access information within the content files in a fast and accurate manner, and to perceive patterns of information within the content files 104.

In the simplified examples referenced above in which the content files 104 include text based documents, the aggregator 118 is described as aggregating content of each cluster of a current level of the hierarchy 106 by concatenating text from each document within a cluster to thereby form a single super document. However, it may be appreciated that such examples are provided for illustrating a simplified, conceptual example operation of the aggregator 118, and that many other variations and optimizations of aggregating operations of the aggregator 118 may be used instead.

For example, continuing the example in which the content files 104 include text based documents, the above description gives examples of operations of the statistics calculator 112 in compiling statistics for each text document, and thereafter storing such statistics within the statistics repository 114. As described in the examples, the cluster calculator 116 may thereafter determine clusters to be output from the cluster algorithm module 108 based on the statistics from the statistics repository 114.

Consequently, the aggregator 118 may include a statistics compiler 122 which may be configured to directly compile or otherwise aggregate statistics within the statistics repository 114 to thereby obtain appropriate input for the cluster calculator 116 in calculating a higher level of clusters for the hierarchy 106.

For example, in a simplified scenario in which the content files 104 include text documents which are initially analyzed by the statistics calculator 112 to determine corresponding statistics therefore, such as, e.g., a calculated number or frequency of selected words, phrases, or content, it may occur that the cluster calculator 116 operates to group two particular documents within a single cluster output from the cluster algorithm module 108. Subsequently, rather than concatenate the actual content of these two text documents, the statistics compiler 122 may compile the statistics associated with the two documents within the statistics repository 114.

For example, the statistics calculator 112 may determine that a first document includes a given word 100 times, and determines that a second document includes the given word 50 times. Then, the statistics compiler 122 may determine that the cluster which includes the two documents includes the given word a total of 150 times. This information may be reflected within the statistics repository 114, e.g., by storing the compiled statistics in association with the cluster containing the two documents. In other words, for example, the statistics repository 114 may be used in a substantially conventional manner, except that, e.g., the statistics repository 114 may store statistics for a cluster of documents as a whole, rather than storing statistics individually for each underlying document.

The above description provides many examples of operations, features, and functions of the system 100 of FIG. 1. Nonetheless, it may be appreciated that the system 100, and similar systems, may include or be associated with many other variations and implementations. For example, in a simplified operation of the system 100, the hierarchy manager 110 may use a single cluster algorithm module 108 to construct each level of the hierarchy 106. In such examples, the single cluster algorithm module 108 may be parameterized consistently for each level 106A-106C. That is, for example, the selected cluster algorithm module 108 may be associated with the same feature selection and other statistic characteristics during calculation of each level of the hierarchy 106.

In other example scenarios, however, the hierarchy manager 110, e.g., the level manager 120, may select a different cluster algorithm module 108 for different levels of the hierarchy 106. Somewhat similarly, the level manager 120 may be configured to utilize different feature selections and associated statistical calculations for each level of the hierarchy 106, when using either the same or different cluster algorithm module 108. Various other additional or alternative implementations and operations of the system 100 of FIG. 1 are described herein, or would be apparent to one of skill in the art.

In the example of FIG. 1, the cluster controller 102 is illustrated as executing on at least one computing device 124, which may include or be associated with at least one processor 124A and a computer readable storage medium 124B. Again, however, it may be appreciated that many various configurations of the system 100 may be implemented beyond the examples illustrated and described with respect to FIG. 1.

For example, it may occur that different elements of the cluster controller 102 are executed using different computing devices (e.g., a remote computer and a local computer which are connected by a particular network). In other examples, elements and components of the system 100 which are illustrated singularly may be implemented using two or more separate subcomponents. Conversely, elements and components illustrated separately from one another may be executed within a single module. These and other configurations of the system 100 may be understood to represent matters of design choice that would be apparent to one of skill in the art, and therefore are not discussed herein in further detail, except as may be necessary or helpful in understanding operations of the system 100 of FIG. 1.

Figure 2:
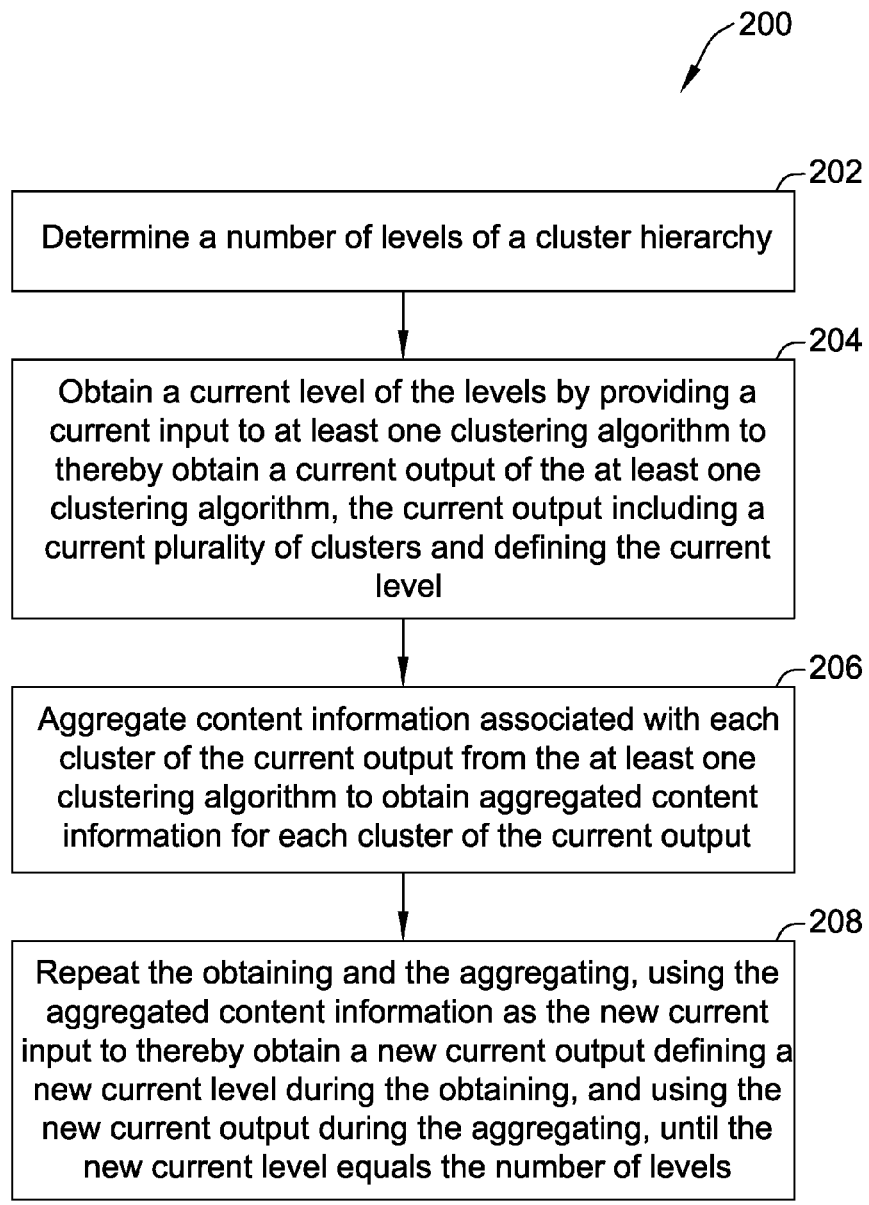

FIG. 2 is a flowchart 200 illustrating example operations of the system 100 of FIG. 1. In the example of FIG. 2, operations 202-208 are illustrated in sequential order. However, it may be appreciated that the flowchart 200 illustrates non-limiting examples of operations of the system 100 of FIG. 1. For example, two or more operations of the operations 202-208 may be executed in a partially or completely overlapping or parallel manner. In other examples, operations may be performed in a different order than that shown. Further, additional or alternative operations may be included.

In the example of FIG. 2, a number of levels of a cluster hierarchy may be determined (202). For example, the level manager 120 may be configured to receive a number of levels 106A-106C of the hierarchy 106. For example, the level manager 120 may receive the designated number of levels to be included in the hierarchy 106 from the user of the system 100, e.g., by way of a graphical user interface (GUI) having appropriate text entry fields for entering a desired number of levels.

As described herein, additional information related to the hierarchy 106 also may be received in conjunction with the determination of the number of levels 106A-106C of the hierarchy 106. For example, the user of the system 100 may further specify a number of clusters to be included/created at each of the levels 106A-106C. Further, the user may designate a particular cluster algorithm module 108 used in executing clustering with respect to some or all of the levels 106A-106C, i.e., may specify a particular cluster algorithm module 108 for each level, or may designate a single cluster algorithm module 108 for all of the levels 106A-106C. In still further examples, the user may designate, using the level manager 120, particular parameters for feature selection and/or statistic calculation that are to be associated with each or all of the levels 106A-106C.

A current level of the levels may be obtained by providing a current input to at least one clustering algorithm to thereby obtain a current output of the at least one clustering algorithm, where the current output includes a current plurality of clusters and defines the current level (204). For example, in an initial iteration of the flowchart 200, the current input may include the plurality of content files 104 which are provided by the hierarchy manager 110 to the cluster algorithm module 108, to thereby obtain a resulting set of clusters thereof, thereby defining the first level 106A of the hierarchy 106.

Content information associated with each cluster of the current output from the at least one clustering algorithm may be aggregated to obtain aggregated content information for each cluster of the current output (206). For example, the aggregator 118 may aggregate content information for each cluster at the first level 106A. For example, as described, such aggregation may include aggregation of actual content of content files within each cluster (e.g., concatenation of text within the content files of each cluster), or may include information characterizing the content. For example, as also described, the statistics compiler 122 may be configured to execute the aggregation by compiling statistics or all content files of a given cluster to serve as the aggregated content information.

The obtaining and the aggregating may be repeated, using the aggregated content information as the new current input to thereby obtain a new current output defining a new current level during the obtaining, and using the new current output during the aggregating, until the new current level equals the number of levels (208). For example, the hierarchy manager 110 may obtain the aggregated content information for the various clusters of the first level 106A, so that the thus obtained aggregated content information may serve as the new current input to the cluster algorithm module 108, which may thus output resulting clusters defining the new current level, i.e., the second level 106B.

Thereafter, a third iteration may be executed in which aggregated content information is obtained for each cluster of the second level 106B, and used as the new current input to the cluster algorithm module 108 to thereby obtain the next level 106C. In the example, a number of levels initially designated may be three, so that, after the third iteration, the new current level 106C equals the originally designated three levels, so that the operations 202-208 of the flowchart 200 may complete.

Figure 3:
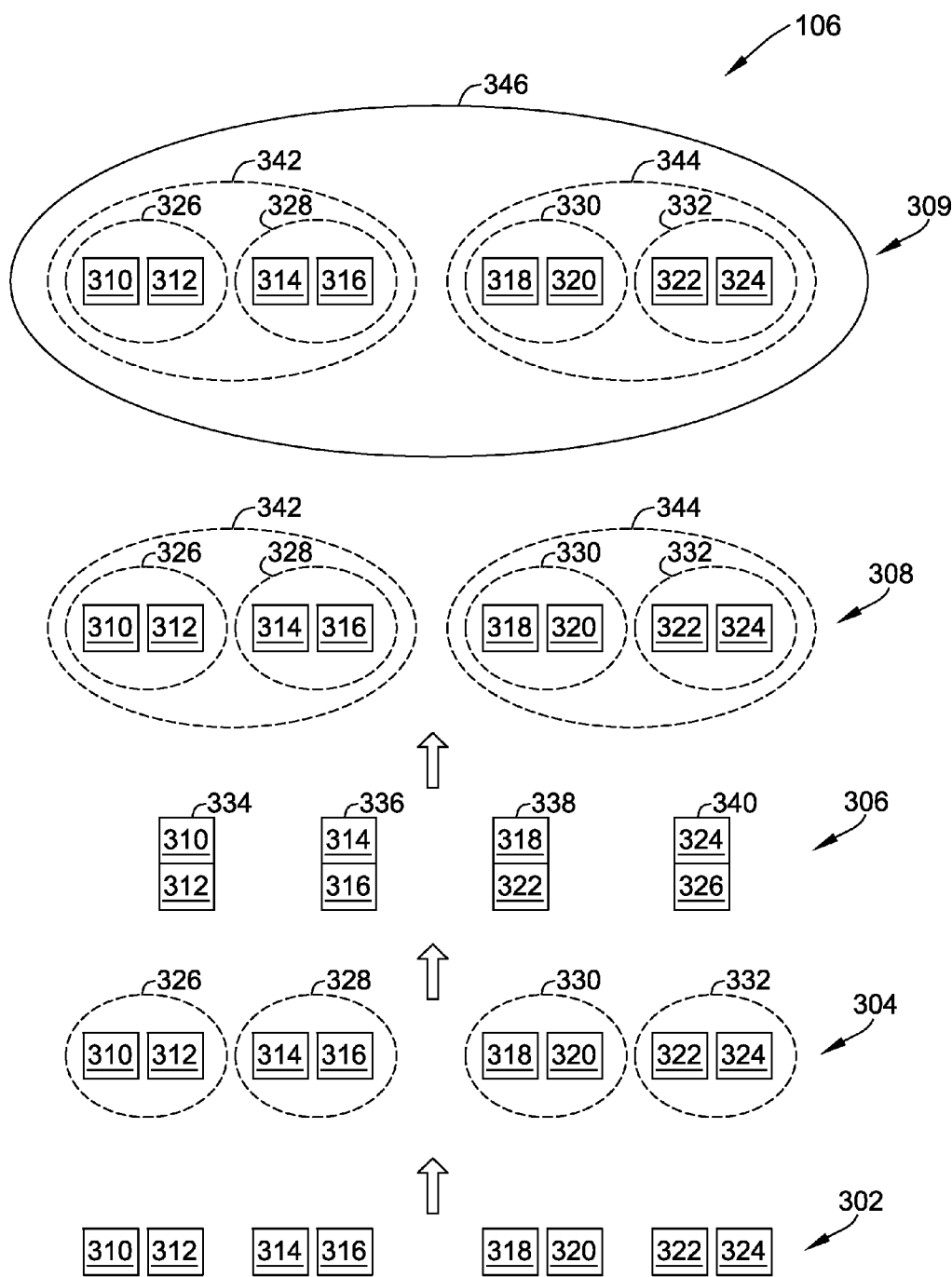

FIG. 3 is a block diagram illustrating an example of hierarchal clustering using the system 100 of FIG. 1. In the example of FIG. 3, a plurality of content files 302 are illustrated which may be understood to be analogous to the content files 104 of FIG. 1. As described in detail below, the content files 302 may be clustered to form a level 304 of a cluster hierarchy, such as the cluster hierarchy 106 of FIG. 1. Subsequently, the clusters of the level 304 may have content information aggregated for each cluster to obtain aggregated content information 306. The aggregated content information may be used to execute further clustering to thereby obtain a second level 308 of a cluster hierarchy. In a similar manner, a third level 309 may be obtained by clustering aggregated content from the second level 308.

In more detail, the content files 302 may include a plurality of text based documents 310-324, as shown. To give a specific example, it may occur that a user of the system 100 has previously solicited feedback from users of a graphical user interface which the operator of the system 100 wishes to evaluate and improve. Thus, the content files 310-324 may each represent separate documents obtained from the users of the graphical user interface, and may each contain feedback from each user regarding the graphical user interface.

In the example, the operator of the system 100 may wish to cluster the documents 310-324 based on some initial clustering criteria and associated selected features to obtain the level 304. For example, the operator may cluster the documents 310-324 based on such meta information as a source or origin of a given document, or based on a time of collection of a given document. The operator may execute clustering based on particular words, phrases, or concepts contained within each document 310-324, such as, e.g., whether the documents include positive or negative feedback regarding the graphical user interface.

Subsequently, the user may wish to form the second level 308 of the cluster hierarchy by clustering the aggregated content information 306 based on specific characteristics and desired feedback associated with the graphical user interface. For example, the operator of the system 100 may wish to have a first cluster which includes feedback related to an aesthetic or visual appearance of the graphical user interface, while having a second cluster related to substantive review(s) of content and functionality associated with the graphical user interface.

Thus, with reference to FIGS. 1 and 2, it may be appreciated that an operator of the system 100 may initially proceed by designating the documents 310-324 for clustering. The operator may utilize the level manager 120 to designate the operator desired for two levels (i.e., the levels 304, 308), to be included within the cluster hierarchy. The operator may further specify a desire for a certain number of clusters at each level 304, 308, and 309. In other examples, the operator may obtain similar results by specifying different parameters, e.g., by specifying a designated maximum number or minimum number of documents to be included within each cluster of a given level, without necessarily limiting the number of clusters at that level.

The operator may further designate desired results by specifying cluster algorithm modules 108 and/or associated feature selections of the one or more selected cluster algorithm modules, in order to obtain the results referenced above. In other words, for example, the operator of the system 100 may obtain desired results by utilizing a single cluster algorithm module 108 to determine the cluster levels 304, 308, and 309, and/or by designating corresponding appropriate feature selections for use by the cluster algorithm module. In additional or alternative examples, the operator of the system 100 may simply use a different cluster algorithm module for each of the desired levels 304, 308, and 309.

In operation, then, the level manager 120 may initially provide the documents 310-324 to the appropriate cluster algorithm module 108. As described above, the statistic calculator 112 may collect designated statistics regarding each of the documents 310-324 for storage thereof within the statistics repository 114. Using this information, the cluster calculator 116 may output clusters 326, 328, 330, and 332, to thereby form the level 304 of the hierarchy. FIG. 3 illustrates a simplified example in which the cluster 326 includes documents 310, 312, the cluster 328 includes 314, 316, the cluster 330 includes the documents 318, 320, and the cluster 332 includes the documents 322, 324.

Subsequently, as referenced above and described herein, the aggregator 118 may be configured to aggregate content information associated with content of the documents contained within each cluster 326-332. For example, with reference to the cluster 326, the aggregator 118 may be configured to obtain aggregated content information for the included documents 310, 312. In the example of FIG. 3, aggregated content information 334 is illustrated as an aggregation of content information associated with documents 310, 312.

As referenced above, the aggregated content information 334 may include an aggregation of the actual content 310, 312. For example, in the case where the documents 310, 312 include text, the aggregated content information 334 may include a concatenation of the text of the documents 310, 312.

In other examples, however, as also described above, the aggregated content information 334 may include a compilation of the statistics associated with the document 310 together with statistics calculated for the document 312. In other words, as described, the statistics compiler 122 may be configured to compile statistics for the documents 310, 312 from the statistics repository 114 to thereby obtain the aggregated content information 334. As may be appreciated, it may be more efficient for the aggregator 118 to utilize the statistics compiler 122 to directly aggregate statistical information within the statistics repository 114, e.g., to thereby reduce or eliminate redundant efforts in determining the statistics from a concatenated or otherwise aggregated version of the document 310, 312.

Similarly, the aggregator 118 and/or the statistics compiler 122 may be configured to obtain aggregated content information 336 associated with the documents 314, 316 of the cluster 328. Further, aggregated content information 338 may similarly be obtained for the documents 318, 320 of the cluster 330, while aggregated content information 340 may be obtained for the documents 322, 324 of the cluster 332. As described herein, regardless of whether the aggregated content information 334-340 includes actual content of the underlying content files, statistical information regarding the content, or other information related to the content, the aggregated content information is of a form which is suitable for input to the one or more cluster algorithm modules 108.

Specifically, in the example where the documents 310-324 include text, it may be appreciated that the resulting aggregated content information 334-340 may include concatenated content (e.g., text) suitable for input to the statistics calculator 112, or, in other described examples the aggregated content information 334-340 may include compiled statistics regarding the corresponding underlying documents, which are directly suitable for input to the cluster calculator 116. Consequently, the cluster calculator 116 may be configured to utilize the aggregated content information 334-340 to calculate clusters 342, 344 of the level 308 of the resulted cluster hierarchy.

As shown and described, it may be appreciated that the cluster 342 at the higher/second level 308 includes underlying clusters 326-328, which themselves include documents 310/312 and 314/316, respectively. Similarly, the cluster 344 includes underlying clusters 330, 332 which themselves include documents 318/320 and 322/324, respectively, as shown. Thus, it may be appreciated that the cluster levels 304 and 308 provide an organization of underlying documents 310-324 and information contained therein, in a manner which facilitates access to, and use of, the documents and associated information by operator of the system 100.

For example, in the user feedback scenario referenced above, it may be straightforward for an operator of the system 100 to first select the cluster 342 as including information pertinent to a visual layout of the graphical user interface on which the feedback has been solicited. From there, the operator of the system 100 may further select included clusters which are related to certain types of feed back, (e.g., positive or negative), or any other characteristic used to execute the clustering of the documents 310-324 to obtain the level 304.

Consequently, it may be straightforward for the operator of the system 100 to locate a desired type of information within the hierarchy. At the same time, it may be possible for the operator of the system 100 to discern patterns, trends, or other meta information about the, in this example, user feedback. For example, the operator may notice that a large majority of the documents (i.e., user feedback) fall into the cluster 342 at the level 308 which is related to a visual layout of the graphical user interface, while only a small minority of the user feedback is included within the cluster 344 of the level 308 associated with substantive feedback regarding content or function of the graphical user interface. Then, the operator of the system 100 may focus efforts accordingly when responding to the user feedback (e.g., when seeking to improve the underlying graphical user interface).

In addition, it may be appreciated that a cluster 346 may be formed at the highest/third level 309 that includes underlying clusters 342 and 344, which themselves include clusters 326, 328, 330, and 332, respectively. Thus, it may be appreciated that the cluster level 309 provides a further organization of underlying documents 310-324 and information contained therein, in a manner which facilitates access to, and use of, the documents and associated information by operator of the system 100.

Of course, as may be appreciated from the above description, the specific example given with respect to FIG. 3 should be considered to be non-limiting with respect to operations of the system 100. For example, the content files 310-324 may include image files. In such examples, the aggregated content information 334-340 may include tiled images of the images within the corresponding underlying content files, and/or may include meta data for each corresponding image file.

Figure 4:
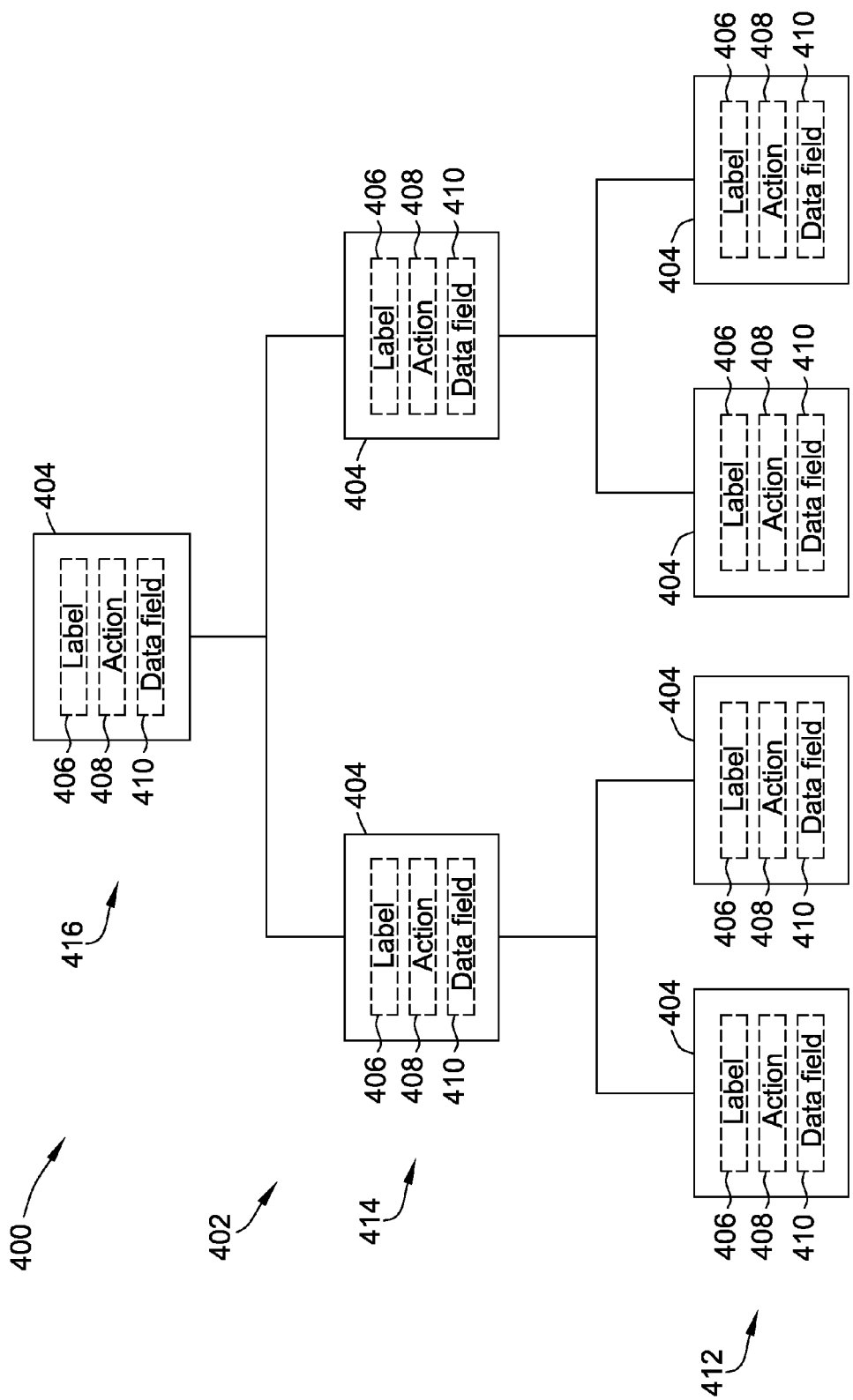

FIG. 4 is a block diagram of an exemplary taxonomy 400 of categories that may be obtained from hierarchy 106 (shown in FIG. 3). Taxonomy 400 may include a plurality of levels 402 arranged in a hierarchy. Each level 402 includes one or more nodes or categories 404, and each category 404 includes a label 406 and optionally an action 408 and/or one or more data fields 410.

In the example shown in FIG. 4, each level 402 of taxonomy 400 corresponds to, or is associated with, a level of hierarchy 106. Accordingly, in the exemplary embodiment, taxonomy 400 includes a first level 412, a second level 414, and a third level 416 that correspond to, or that are associated with, level 304, level 308, and level 309, respectively, of hierarchy 106. In addition, one or more clusters within hierarchy 106 are "mapped to," or associated with, each category 404. Alternatively, one or more categories 404 may not have any clusters associated therewith. It should be recognized that taxonomy 400 may include any number of levels 402, and any number of categories 404 may be defined for each level 402.

As taxonomy 400 is arranged in a hierarchy of categories 404, each category 404 has a parent and/or one or more children categories 404 defined. In addition, each cluster associated with a referenced category 404 has a parent and/or one or more children clusters defined that are associated with the parent and/or child category 404 associated with the referenced category 404. More specifically, a "parent" category 404 refers to a category 404 at a next higher level 402 of taxonomy 400 with respect to a referenced category 404. A "child" category 404 refers to a category 404 at a next lower level 402 of taxonomy 400 with respect to a referenced category 404.

Each category 404 includes at least one label 406 that identifies a common characteristic of the clusters and/or content files 302 associated with category 404. Labels 406 for each category 404 may be based on labels associated with the clusters and/or content files 302 associated with categories 404. For example, labels 406 may be based on statistical information related to each cluster and/or content files 302 within each cluster. The statistical information may include information stored in statistical repository 114 and/or information generated by statistics calculator 112 (both shown in FIG. 1). The labels 406 may be assigned by hierarchy manager 110 or by any other module or device.

In addition, one or more actions 408 may be identified for one or more categories 404. Actions 408 may be automatically executed or performed, for example, when a content file 302 is associated with, or included within, category 404. It should be recognized that not every category 404 may have an associated action 408. For example, at higher levels 402 of taxonomy 400, actions 408 may not be associated with categories 404 because categories 404 may be too broad to identify a proper action 408 that would be relevant to each content file 302 and/or cluster associated with category 404.

Categories 404 may include one or more data fields 410. For example, data fields 410 may include a number of clusters and/or content files 302 included within each category 404, a list of keywords included within content files 302 and/or clusters, and/or any other suitable data that enables taxonomy 400 to function as described herein.

A statistical value, such as a topic purity score, is assigned to each cluster within each category 404. The topic purity score represents a level of confidence that a cluster is properly associated with a category 404, for example, based on the label 406 of the category 404. More specifically, the topic purity score is generated based on a measure of the degree to which data included in a cluster matches the attributes (such as the label 406) of the category 404 that the cluster is associated with. For example, a topic purity score may be based on whether data included in content files 104 of a cluster includes the data patterns associated with the label 406, the placement of words associated with the label 406, the keywords associated with the label 406, and so forth. In this example, the larger the amount of data in a cluster that matches the attributes of a label 406, the higher the topic purity score is for the accuracy or confidence of the association of the label 406 with the cluster. The topic purity score may be represented as a percentage, where 100% represents a highest level of confidence in the association of the label 406 with the cluster, and 0% represents the lowest level of confidence in the association of the label 406 with the cluster.

In some embodiments, if content files 302 include one or more documents, a ratio of a number of labeled documents associated with a particular cluster label 406 (i.e., the label 406 associated with the cluster) to the total number of labeled documents in a cluster can be calculated as a measure of purity of the cluster label 406 (e.g., the topic purity score of cluster label 406). More specifically, if for a given cluster, the number of labeled documents with labels "A," "B," and "C" are represented as $m_A$, $m_B$, and $m_C$, respectively, then the purity (i.e., the topic purity score) of the labeled cluster label 406 can be calculated as:

$$\text{Label Purity} = \max(m_A, m_B, m_C)/(m_A + m_B + m_C) \quad \text{(Eq. 1)}$$

wherein $\max(m_A, m_B, m_C)$ is the number of labeled documents corresponding to cluster label 406. Therefore, if a high percentage of labeled documents within a cluster correspond to the particular cluster label 406, the cluster label 406 could more likely be representative of the documents grouped together into the cluster. On the other hand, if only a low percentage of labeled documents correspond to the cluster label 406, the cluster label 406 is less likely to be representative of the corresponding cluster.

In some implementations, even when a high percentage of labeled documents within a cluster correspond to the cluster label 406, additional metrics may be needed to determine whether the cluster label 406 could be used to represent the cluster. For example, consider a cluster that includes eight labeled documents with the label "A," one labeled document with the label "B," one labeled document with the label "C," and the cluster includes ten thousand documents in all. In such cases, even though the topic purity score of the label "A" is significantly high (80%), the label may not be a good representative of all the documents in the cluster because of the very low number of corresponding labeled documents compared to the size of the entire cluster. In some implementations, identification of the cluster label 406 for a cluster can depend, at least in part, on determining if a high percentage of documents with a particular label end up in the cluster.

In some implementations, the ratio of the labeled documents associated with a particular cluster label 406 in a given cluster to the total cluster size can be calculated as a measure of confidence on the labeled documents. For example, if for a given cluster, the number of labeled documents with labels "A," "B," and "C" are $m_A$, $m_B$, and $m_C$, respectively, and the total number of documents in the given cluster is N, the measure of confidence can be given by:

$$\text{Label Confidence} = (m_A + m_B + m_C)/N \quad \text{(Eq. 2)}$$

Therefore, if the labeled documents corresponding to the particular cluster label 406 make up a high percentage of the total cluster size, the cluster label 406 could more likely be representative of the documents grouped together into the cluster. On the other hand, if the labeled documents make up only a low percentage of the total cluster size, the cluster label 406 is less likely to be representative of the corresponding cluster.

In one embodiment, the topic purity score is calculated and assigned by statistics compiler 122 (shown in FIG. 1) using Eq. 1 and/or Eq. 2. Alternatively, the topic purity score may be calculated and/or assigned by statistics calculator 112 (shown in FIG. 1) or by any other device or module. A purity threshold is defined to facilitate determining whether each cluster is assigned to the proper category 404. In the exemplary embodiment, the purity threshold is equal to a topic purity score of about 80%. Alternatively, the purity threshold may be any other topic purity score, or any other value that enables taxonomy 400 to function as described herein.

In one operational example, taxonomy 400 may be a taxonomy 400 of customer service feedback or issues transmitted to a company by users of a product. The feedback may be transmitted to the company in a plurality of content files 302 (shown in FIG. 3). Content files 302 are clustered using cluster controller 102 (shown in FIG. 1) and the clusters are grouped in categories 404 based on common characteristics of content files 302 within each cluster. A label 406 is assigned to, or associated with, each category 404 and/or each cluster and content file 302 with category 404. In addition, a topic purity score is calculated for each cluster associated with each category 404.

In one embodiment, taxonomy 400 may be arranged as a hierarchical tree structure of domain specific issues or categories 404, which starts with broad, generic issues, and "drills down" into more specific subcategories of each issue. The domain may be a product, such as an advertising product, that includes a plurality of product areas in which customers or users generate feedback. The product areas may include account management, billing, campaign management, performance, policy, and/or any other product area. In one example, each domain (e.g., product) includes a separate taxonomy 400, and each product area is associated with a category at the highest level 402 of taxonomy 400 (e.g., the third level 416 shown in FIG. 4). Alternatively, each domain is associated with a category 404 at the highest level 402 of taxonomy 400 (e.g., the third level 416), and each product area is a child of the domain such that product areas are associated with categories 404 included within a second-highest level 402 of taxonomy 400 (e.g., the second level 414 shown in FIG. 4).

Each product area (e.g., each category 404 associated with each product area) may include a plurality of child categories 404 representative of more specific sub-issues for the parent category 404. The sub-issues (represented by child categories 404) for the billing category 404 may include, for example, payment processing, credits, and/or refunds. Each sub-issue may be subdivided into further sub-categories 404, which are represented in taxonomy as child categories 404 of the sub-issues. Accordingly, each child category 404 is a more specific instantiation of a more generic parent category 404. As a result of this hierarchical property of taxonomy 400, content files 302 and/or the clusters labeled with specific child categories 404 may be combined into, and/or associated with, their parent category 404 such that the label 406 of the parent category 404 is still applicable to the combined content files 302 and/or clusters.

For example, the hierarchical property of taxonomy 400 may be used in a quality review of the clusters. Specifically, a cluster may include content files 302 that are associated with two or more related topics, rather than the same topic. Considered separately, each of the topics may not meet the purity threshold of about 80% topic purity (e.g., none of the categories 404 represent 80% topic majority in the cluster). However, if the sub-categories 404 are combined into the parent category 404, the topic purity of the resulting cluster and/or parent category 404 will increase, and may exceed the about 80% purity threshold for acceptance. Accordingly, this ability to combine or re-categorize clusters enables the clusters of content files 302 that have a relatively low topic purity (e.g., less than the purity threshold) to be salvaged, thus saving the clusters from being discarded as not passing the purity threshold. An overall recall metric (e.g., a percentage of content files 302 successfully recognized by taxonomy 400) may be increased.

Figure 5:
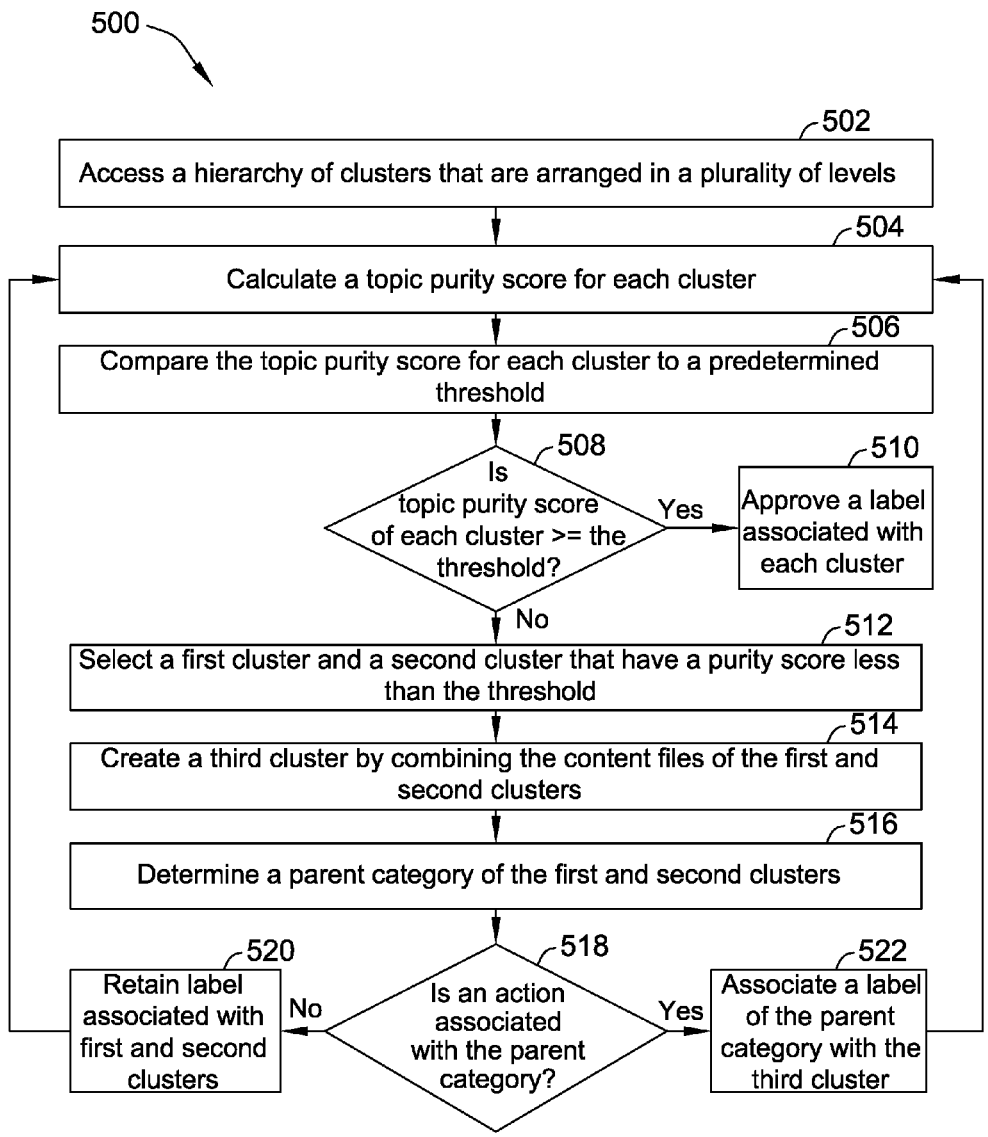

FIG. 5 is a flow diagram of an exemplary method 500 of organizing content files 302 (shown in FIG. 3). In the exemplary embodiment, method 500 is executed by computing device 124, such as by cluster controller 102 (both shown in FIG. 1).

Method 500 includes accessing 502 a hierarchy 106 of clusters that are arranged in a plurality of levels, and a taxonomy 400 of categories 404 associated with hierarchy 106. A topic purity score is calculated 504 for each cluster and the topic purity score for each cluster is compared 506 to a predetermined purity threshold. In one embodiment, the purity threshold is equal to a topic purity score of about 80% (e.g., a confidence level of about 80% that label 406 is properly associated with the cluster).

Each cluster associated with a category 404 is labeled with a category label 406 (i.e., a category label 406 is associated with the cluster). If the topic purity score of each cluster is determined 508 to be not less than the purity threshold (i.e., equal to or greater than the purity threshold), hierarchy manager 110 or another module or device approves 510 a label 406 associated with each cluster.

However, if the topic purity scores of a plurality of clusters are each determined 508 to be less than the purity threshold, a first cluster and a second cluster are selected 512 that have topic purity scores less than the threshold. In one example, the label 406 of the first cluster is different from the label 406 of the second cluster such that the first cluster and the second cluster are initially associated with different categories 404. The first cluster and the second cluster are combined to create 514 a third cluster. More specifically, content files 302 of the first cluster and the second cluster are combined, using aggregator 118 (shown in FIG. 1) to create 514 the third cluster.

A common parent category 404 of the first cluster and the second cluster is determined 516, for example, by referencing taxonomy 400. Method 500 determines 518 whether an action 408 is associated with parent category 404, for example, by reading a flag or data location indicative of whether an action 408 is defined for, or associated with, category 404.

If an action 408 is not associated with parent category 404, the labels 406 currently associated with the first cluster and the second cluster are retained 520. Method 500 then returns to calculating 504 a topic purity score for each cluster.

However, if an action 408 is determined 518 to be associated with parent category 404, a label 406 of parent category 404 is associated 522 with the third cluster such that the third cluster is "labeled" with the label 406 of parent category 404. Labeling the third cluster with the label 406 of the parent category 404 replaces the label 406 of the first cluster and the second cluster. Accordingly, the third cluster is associated with parent category 404 and is effectively moved up a level 402 within taxonomy 400. As such, the third cluster is associated with a broader, or more general, category 404 than the categories 404 of the first cluster and the second cluster.

For example, if a label 406 for category 404 of the first cluster and/or the second cluster is "Customer has questions about an activation fee," an action may be defined to include sending the customer a frequently-asked-questions (FAQ) document regarding activation fees. However, if the parent category 404 for the first cluster and the second cluster includes other billing issues, parent category 404 may be sufficiently broad such that a common action may not be able to be determined that would be applicable for each content file 302 and/or cluster. Accordingly, if a rule is defined that requires an action to be performed on each content file 302 within taxonomy 400 and/or hierarchy 106, the clusters may not be moved up to a parent category 404 if an action would no longer be associated with the clusters.

After associating 522 the label 406 of the parent category 404 with the third cluster, method 500 returns to calculating 504 a topic purity score for each cluster. Accordingly, a topic purity score of the third cluster is calculated 504 and is compared 506 to the purity threshold as described above. If the topic purity score of the third cluster is greater than or equal to the purity threshold, the label of the third cluster is approved. If the topic purity score of the third cluster is less than the purity threshold, the third cluster is combined with another cluster having a topic purity score that is less than the purity threshold to create 514 a further combined cluster. A new label is determined for the third cluster, and method 500 continues in a similar manner as described above.

While the foregoing embodiments have been described with respect to receiving customer feedback and/or documents, it should be recognized that the embodiments described herein may also be used to categorize and/or organize content files 302 from any source.

Figure 6:
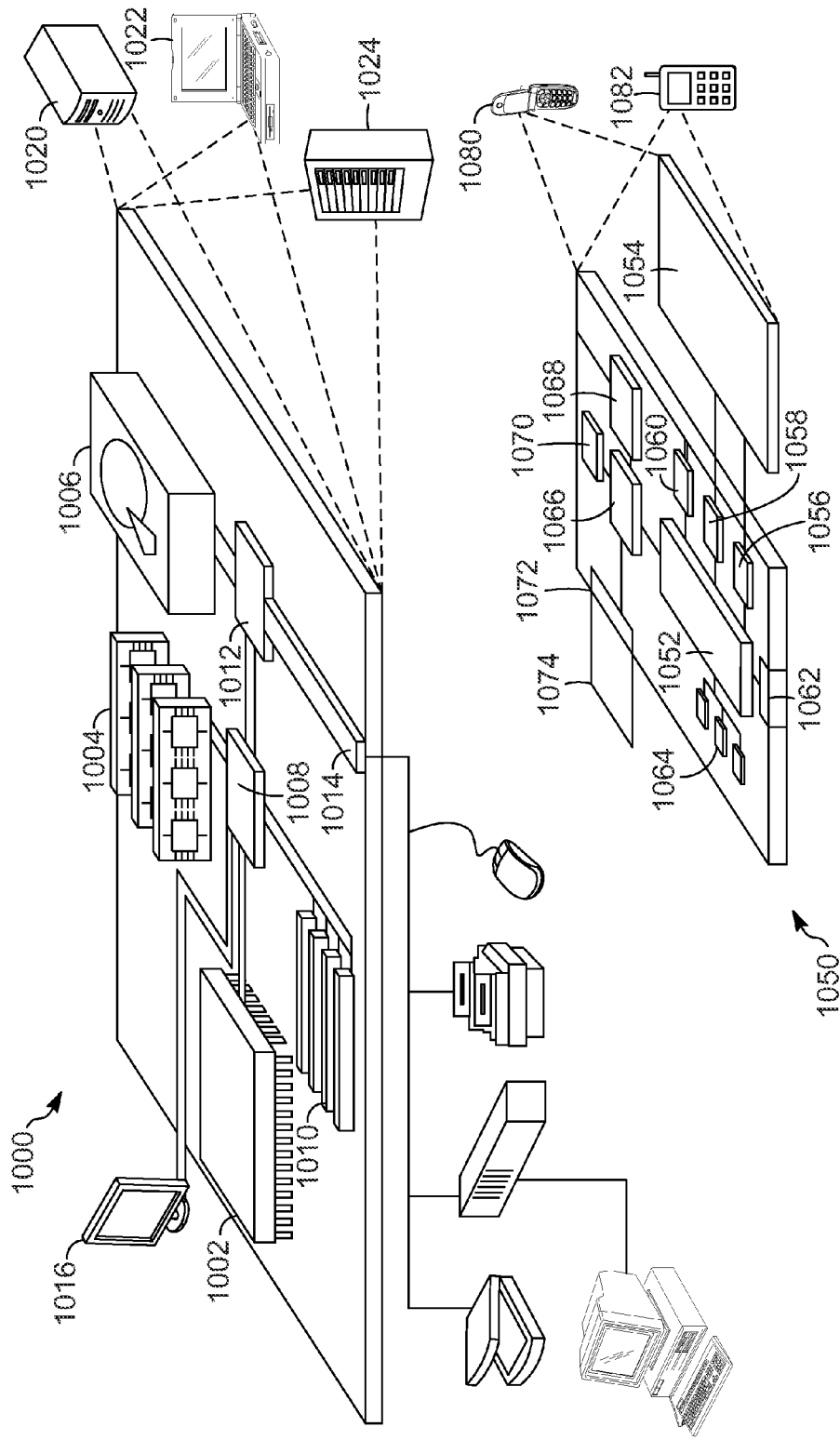

FIG. 6 is a block diagram showing example or representative computing devices and associated elements that may be used to implement the systems and methods of FIGS. 1 through 5. FIG. shows an example of a generic computing device 1000 and a generic mobile computing device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface or controller 1008 connecting to memory 1004 and high-speed expansion ports 1010, and a low-speed interface or controller 1012 connecting to low-speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed controller 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low-speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed bus 1014. The low-speed bus 1014, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 550. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning system) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 1000 and/or 1050) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 1000 and 1050 are configured to receive and/or retrieve electronic documents from various other computing devices connected to computing devices 1000 and 1050 through a communication network, and store these electronic documents within at least one of memory 1004, storage device 1006, and memory 1064. Computing devices 1000 and 1050 are further configured to manage and organize these electronic documents within at least one of memory 1004, storage device 1006, and memory 1064 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer implemented method including executing instructions stored on a computer-readable medium, said method comprising:
   accessing a hierarchy of clusters, wherein each cluster includes at least one content file, and wherein a label is associated with each cluster;
   calculating a topic purity score for each cluster;
   selecting a first cluster and a second cluster from the hierarchy of clusters, wherein the topic purity score of the first cluster and the topic purity score of the second cluster are less than a purity threshold;
   creating a third cluster by combining the content files included within the first cluster and the second cluster;
   determining a parent category of the first cluster and the second cluster, wherein the parent category is at a level within the hierarchy higher than a level of the first cluster and the second cluster;
   determining whether an action is associated with the parent category, the action providing a response to a topic of the content file;
   associating a label of the parent category with the third cluster if an action is associated with the parent category such that the label of the first cluster and the label of the second cluster are replaced with the label of the parent category;
   and retaining the labels of the first cluster and the second cluster if no action is associated with the parent category.

2. The computer-implemented method of claim 1, wherein a first label is associated with the first cluster and a second label different from the first label is associated with the second cluster.

3. The computer-implemented method of claim 2, wherein associating a label of the parent category comprises replacing the first label and the second label with the label of the parent category.

4. The computer-implemented method of claim 1, further comprising calculating a topic purity score of the third cluster.

5. The computer-implemented method of claim 4, further comprising approving the label of the third cluster if the topic purity score of the third cluster is not less than the purity threshold.

6. The computer-implemented method of claim 4, further comprising determining a new label for the third cluster if the topic purity score of the third cluster is less than the purity threshold.

7. The computer-implemented method of claim 1, wherein the action includes at least one of transmitting a document to a user, transmitting an message to the user, initiating a communication with the user, and transmitting a message to a supervisor.

8. A computer system comprising:
   a computer-readable storage medium for storing computer-executable instructions;
   and a processor coupled to said computer-readable storage medium, wherein said processor is configured to execute the computer-executable instructions to:
   calculate a topic purity score for each cluster within a hierarchy of clusters, wherein each cluster includes at least one content file, and wherein a label is associated with each cluster;
   select a first cluster and a second cluster from the hierarchy of clusters, wherein the topic purity score of the first cluster and the topic purity score of the second cluster are less than a purity threshold;
   create a third cluster by combining the content files included within the first cluster and the second cluster;
   determine a parent category of the first cluster and the second cluster, wherein the parent category is at a level within the hierarchy higher than a level of the first cluster and the second cluster;
   determine whether an action is associated with the parent category, the action providing a response to a topic of the content file;
   associate a label of the parent category with the third cluster if an action is associated with the parent category such that the label of the first cluster and the label of the second cluster are replaced with the label of the parent category;
   and retain the labels of the first cluster and the second cluster if no action is associated with the parent category.

9. The computer system of claim 8, wherein a first label is associated with the first cluster and a second label different from the first label is associated with the second cluster.

10. The computer system of claim 9, wherein associating a label of the parent category comprises replacing the first label and the second label with the label of the parent category.

11. The computer system of claim 8, further comprising calculating a topic purity score of the third cluster.

12. The computer system of claim 11, further comprising approving the label of the third cluster if the topic purity score of the third cluster is not less than the purity threshold.

13. The computer system of claim 12, further comprising determining a new label for the third cluster if the topic purity score of the third cluster is less than the purity threshold.

14. The computer system of claim 8, wherein the action includes at least one of transmitting a document to a user, transmitting an message to the user, initiating a communication with the user, and transmitting a message to a supervisor.

15. A non-transitory computer-readable storage medium including computer-executable instructions stored thereon that, when executed, cause a processor to;
   access a hierarchy of clusters, wherein each cluster includes at least one content file, and wherein a label is associated with each cluster;
   calculate a topic purity score for each cluster;
   select a first cluster and a second cluster from the hierarchy of clusters, wherein the topic purity score of the first cluster and the topic purity score of the second cluster are less than a purity threshold;
   create a third cluster by combining the content files included within the first cluster and the second cluster;
   determine a parent category of the first cluster and the second cluster, wherein the parent category is at a level within the hierarchy higher than a level of the first cluster and the second cluster;
   determine whether an action is associated with the parent category, the action providing a response to a topic of the content file;
   associate a label of the parent category with the third cluster if an action is associated with the parent category such that the label of the first cluster and the label of the second cluster are replaced with the label of the parent category; and
   retain the labels of the first cluster and the second cluster if no action is associated with the parent category.

16. The non-transitory computer-readable medium of claim 15, wherein a first label is associated with the first cluster and a second label different from the first label is associated with the second cluster, and wherein the computer-executable instructions, when executed, cause the processor to associate the label of the parent category by replacing the first label and the second label with the label of the parent category.

17. The non-transitory computer-readable medium of claim 15, wherein the computer-executable instructions, when executed, cause the processor to calculate a topic purity score of the third cluster.

18. The non-transitory computer-readable medium of claim 15, wherein the computer-executable instructions, when executed, cause the processor to approve the label of the third cluster if the topic purity score of the third cluster is not less than the purity threshold.

19. The non-transitory computer-readable medium of claim 15, wherein the action includes at least one of transmitting a document to a user, transmitting an message to the user, initiating a communication with the user, and transmitting a message to a supervisor.

* * * * *